June 29, 1948.  G. M. ROTHENBERGER  2,444,313
BRAKE MECHANISM FOR ELECTRIC MOTORS
Filed Sept. 27, 1943  3 Sheets-Sheet 1
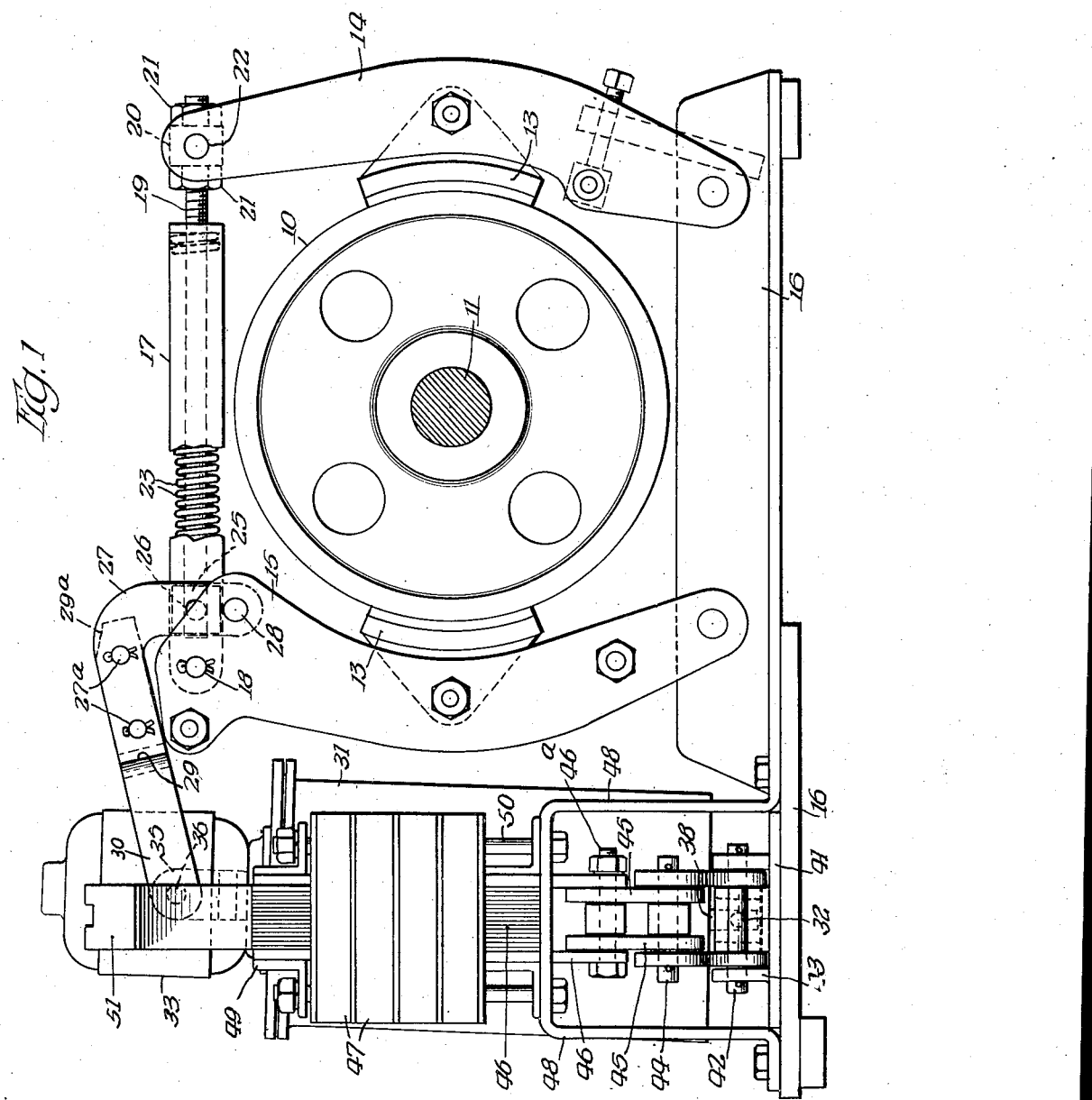
Inventor
George M. Rothenberger
By Fred Gerlach Atty.

June 29, 1948.  G. M. ROTHENBERGER  2,444,313
BRAKE MECHANISM FOR ELECTRIC MOTORS
Filed Sept. 27, 1943  3 Sheets-Sheet 2
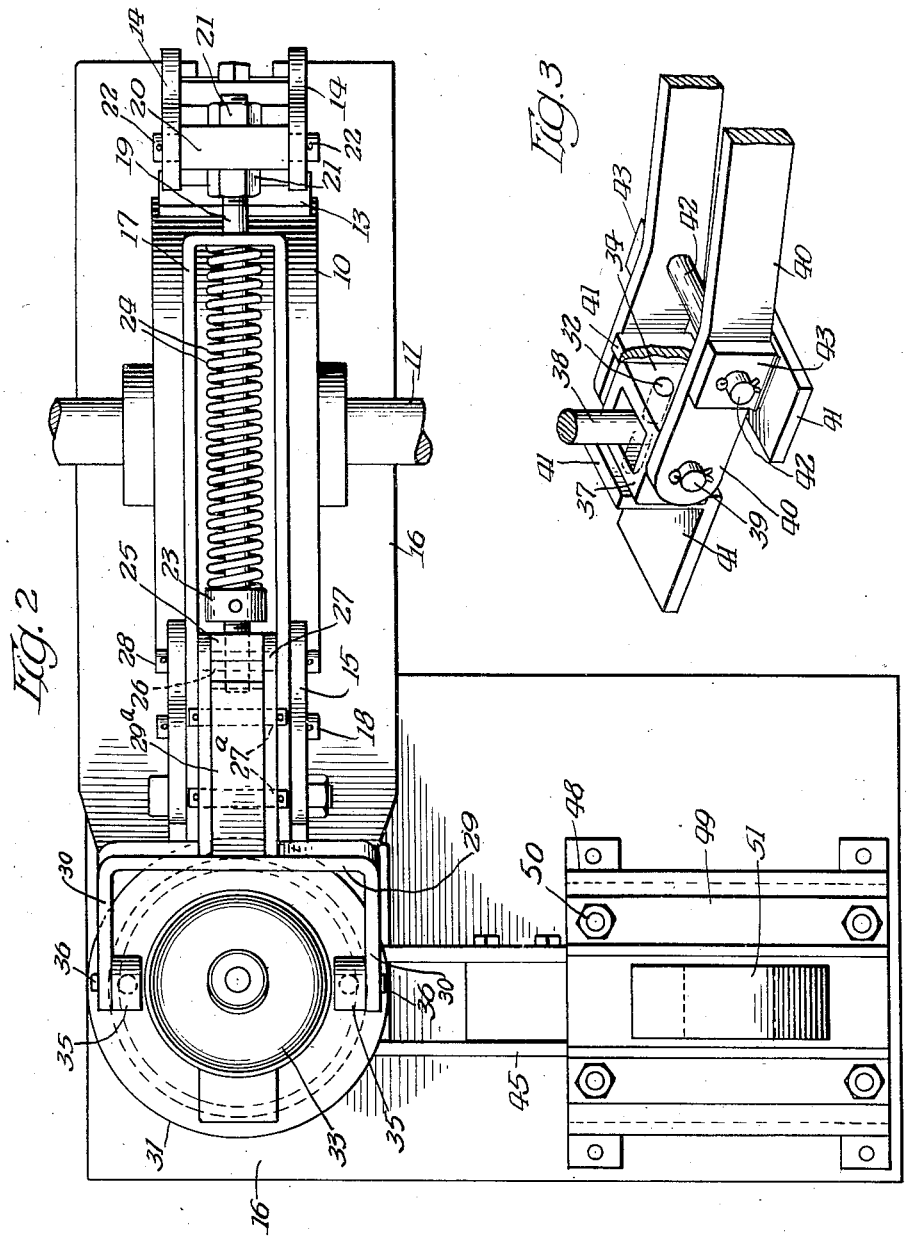
Inventor:
George M Rothenberger
By Fred Gerlach
Atty.

June 29, 1948.  G. M. ROTHENBERGER  2,444,313
BRAKE MECHANISM FOR ELECTRIC MOTORS
Filed Sept. 27, 1943  3 Sheets-Sheet 3
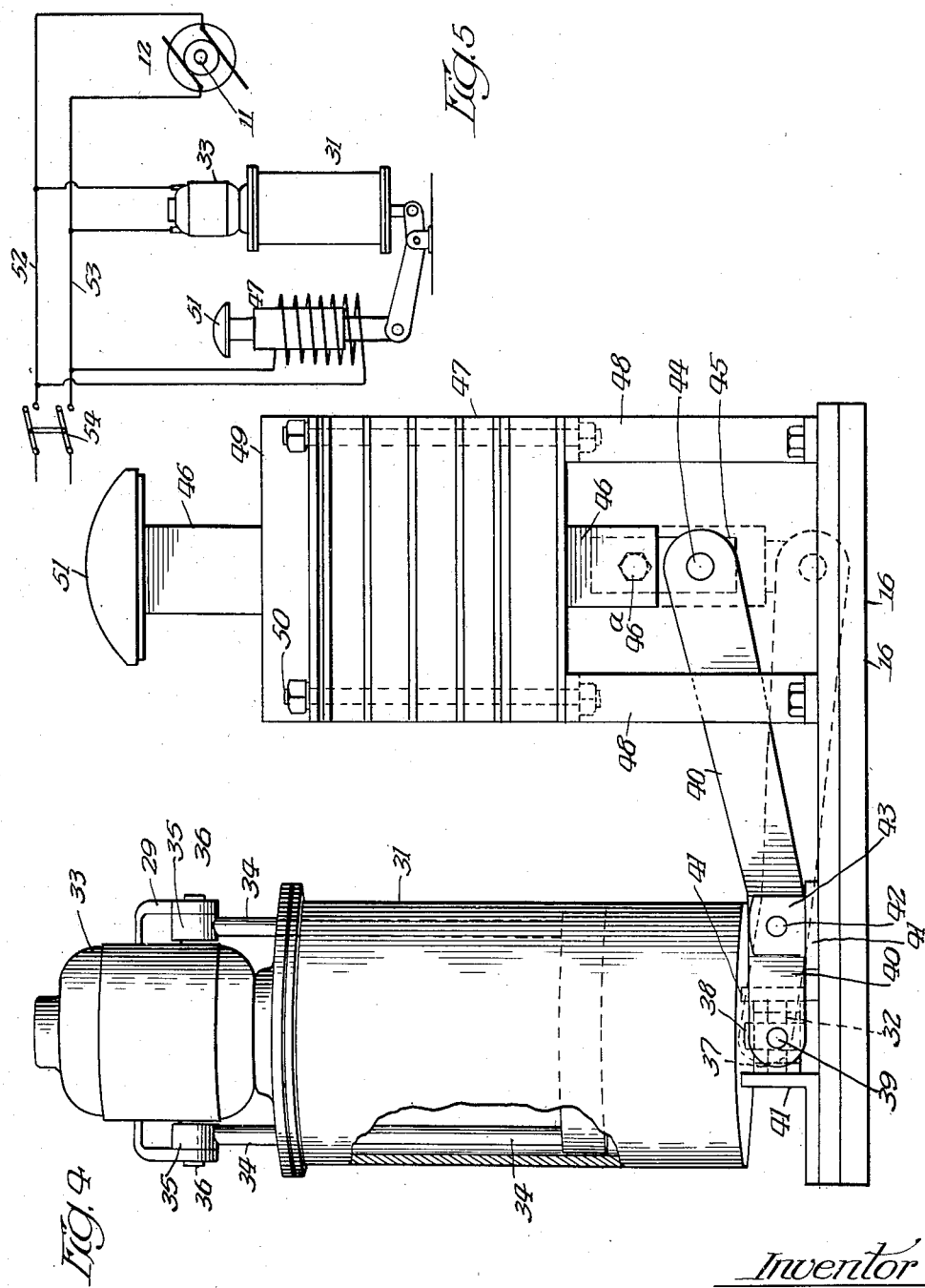
Inventor
George M. Rothenberger
By Fred Gerlach
Atty Patented June 29, 1948

2,444,313

UNITED STATES PATENT OFFICE 2,444,313

BRAKE MECHANISM FOR ELECTRIC MOTORS

George M. Rothenberger, Harvey, Ill., assignor to Whiting Corporation, Harvey, Ill., a corporation of Illinois Application September 27, 1943, Serial No. 503,875

7 Claims. (Cl. 318—366)

This invention relates in general to brake mechanism and is more particularly described as a combination thruster and solenoid brake. The invention comprises a spring applied brake mechanism controlled by a motor operated fluid thruster combined with a solenoid for mounting and operating the thruster so that as soon as current is cut off from the motor which operates the brake wheel, from the thruster, and from the solenoid, the solenoid moves the whole thruster thereby allowing the spring to set the brake quickly and then the thruster can slowly return to its off position.

In the operation of the ordinary motor controlled thruster brake employing a piston movable by fluid pressure in a cylinder and allowed to drop or return slowly to its off position, trouble is sometimes experienced due to the sluggishness of the thruster. When this arrangement is used, for example, on a motor driven hoist, the current is cut off from the motor, the thruster is so slow in allowing the brake to set, that considerable drift or movement is sometimes experienced. One of the principal uses for a thruster of this type is to quickly obtain a dragging effect of the brake for precision operation or stopping of the brake.

An important object of the invention is in combining a solenoid with a thruster type of spring operated brake so that when energizing current is cut off, gravity causes the thruster raised by the solenoid to drop, thus completing a quicker operation or set of the brake.

A further object of the invention is in locating and arranging a solenoid in close spaced compact arrangement with respect to a thruster type brake cylinder and brake drum so that they are effective and efficient in operation and occupy a minimum space.

Another object of the invention is to provide a combined thruster and solenoid brake mechanism which is generally of new and improved construction and is characterized by simplicity of design as well as ease and facility of assembly.

Other objects of the invention and various advantages and characteristics of the present combined thruster and solenoid brake will be apparent from a consideration of the following detailed description.

The invention consists in the several novel features which are hereinafter described and more particularly defined by the claims at the conclusion thereof.

In the drawings which accompany and form a part of this specification or disclosure and in which like letters and numerals of reference denote corresponding parts throughout the several views:

Fig. 1 is an elevation of a combined thruster and solenoid brake mechanism in accordance with this invention;

Fig. 2 is a top plan view of the mechanism shown in Fig. 1;

Fig. 3 is a perspective view of the pivoting and supporting connection between the thruster and the solenoid;

Fig. 4 is an elevational view of the thruster and solenoid; and

Fig. 5 is a diagrammatic view showing the circuit connections for the driving and thruster motors and the solenoid.

The invention will be described as it relates to a spring applied brake as operated, for example, by a hoist motor in which a known type of thruster having a piston movable in a cylinder is operated by an electric motor and is connected to release the spring pressure when the motor is operated. The entire thruster is pivoted at one end to swing in accordance with the operation of the thruster and is so mounted and connected with respect to a solenoid that the operation of the latter effects a quicker release of the thruster to insure a more rapid operation of the brake.

Referring now more particularly to the drawings, a brake drum 10 is mounted upon a shaft 11 which is connected to suitable driving mechanism which may be represented as operated or driven by an electric motor 12. The brake drum is engaged at opposite sides by brake shoes 13 pivoted in two sets of parallel levers 14 and 15 pivotally mounted at their lower ends in a common base 16.

Between the upper ends of the levers 14 and 15 is a U-shaped link 17 with the bifurcated ends connected by a pivot 18 to the upper ends of levers 15 and with a threaded rod 19 extending loosely through the opposite end of the link and carrying a collar 20 between opposite adjusting nuts 21 threaded against it on the rod 19, the collar having projecting pivots 22 extending through the upper ends of the levers 14.

The threaded rod 19 also extends within the link 17 and mounted upon it between the closed end of the link and a threaded collar 23 adjustable on the rod is a partially compressed coil spring 24. The coil spring thus tends to draw the upper extremities of the brake levers together applying the brake shoes to the brake drum 10.

Threaded on the inner end of the rod 19 is a collar 25 having oppositely extending pivots 26 which engage in angle levers 27 mounted at each side between the collar and the adjacent lever arm 15. The angle levers have corresponding ends connected to the upper ends of the levers 15 by a transverse pivot 28 upon a fulcrum close to that of the pivots 26 so that the levers are connected to the block 25 by a short lever arm by pins 27a at opposite sides of a block stem 29a rigidly secured to a yoke 29 having opposite extremities 30.

Mounted at the outer side of the levers 15 and closely adjacent thereto is a motor operated fluid thruster which comprises a cylinder 31 mounted to swing at its lower end upon a pivot 32 and having an electric motor 33 at the top located between the extremities 30 of the yoke. Projecting through the top of the cylinder at the sides of the motor are piston rods 34 each having a mounting block 35 at its upper end to which the yoke extremities 30 are connected by pivots 36. When the motor 33 is operated, the rods 34 are simultaneously thrust upwardly or outwardly, from cylinder 31, thus raising the ends 30 of the yoke rocking the cylinder 31 about the pivot 32 and rotating the angle levers 27 about their pivot 28 and with the short leverage applied between the pivots 28 and 26, moving the threaded rod 19 and compressing the spring 24, tending to free the upper ends of the brake levers 14 for movements apart and thus allowing the brake drum to move freely between the brake shoes 13.

When the current to the motor 33 is cut off, the thruster rods are retracted and the thruster returns slowly to its off position, depending upon the setting of the thruster. The movement of the angle levers allows the spring 23 to expand and to apply the levers 14 and 15 and their brake shoes 13 in a normal manner and causes a rocking movement of the thruster cylinder about its mounting pivot 32.

To provide for a quicker movement of the thruster, the pivot 32 is mounted at the end of a supporting stem 38 projecting from the bottom of cylinder 31 and is carried by a hollow block 37. Projecting outwardly from intermediate sides of the hollow block 37 at right angles to the pivot 32 are pivots 39 to which the extremities of levers 40 are secured. The block to which the end projecting stem 38 is pivoted, is slidably mounted between the upright parallel portions of angle brackets 41 rigidly secured to the base 16. The levers 40 are located at the edges of the brackets 41 and confine the block between the brackets and the levers for sliding movement of the block and the members connected thereto. The levers 40 are thus spaced apart and they are mounted in a fixed fulcrum comprising a bearing pin 42 extending through both of the levers near the end which is connected to the thruster cylinder, the extremities of the pin being mounted in upward bearing projections 43 extending from bracket 41 which is suitably attached to the base 16.

The other ends of the levers 40 are connected by a pivot 44 with the lower ends of links 45 and the upper ends of the links are connected by a pivot 46a to the lower end of a movable solenoid core 46 which extends through the magnet windings 47. The magnet windings and the core are suitably mounted above the base 16 by supports 48 secured to the base, and the windings are held in place by upper supporting plates 49 and fastening bolts 50. The core 46 also extends above the windings where it is provided with a knob or head 51 for manually raising or lowering the core.

Thus the solenoid is mounted at one side of the thruster with the mounting levers extending at right angles to the direction of rocking movement of the thruster.

For operating purposes, the motor 12 which operates the brake drum 10, the thruster motor 33, and the solenoid windings 47 may be connected to the same supply mains 52 and 53 which receive current from the same supply means through a common switch 54. When the operating motor 12 and the thruster motor 33 are in operation, the solenoid is also energized moving the core 46 downwardly to its lowermost position and raising the pivot 32 of the thruster cylinder and thus with the thruster compressing the spring 24 and releasing the brake drum 10 for free operation. When the current is cut off, the thruster rods 34 will descend according to the thruster setting, and the solenoid is deenergized, but the weight of the thruster is greater than the weight of the solenoid core, and gravity causes the thruster to drop quickly with its pivot 32, raising the core 46 within the solenoid by the action of the connecting levers 40. This quickly depresses the thruster levers 27, and allows the brake spring 24 quickly to apply the brake shoes and effect a quicker operation and setting of the brake.

The invention is not to be understood as restricted to the details set forth since these may be modified within the scope of the appended claims without departing from the spirit and scope of the invention.

Having thus described the invention, what I claim as new and desire to secure by Letters Patent is:

1. In a brake mechanism, a solenoid brake comprising a motor driven brake drum, spring pressed lever operated brake shoes to engage the drum, a motor operated thruster for relieving the pressure of the spring upon the brake levers, a movable pivot mounting for the thruster including a lever connected thereto at one end and the lever pivoted intermediate its ends, a magnet core secured to the other end of the lever, and magnet windings for actuating the core, the magnet windings, a thruster motor, and a driving motor being included in a common circuit so that the solenoid is deenergized when the two motors are cut off allowing the thruster to fall by gravity to set the brake operating springs and to raise the magnet core in the solenoid windings.

2. In brake mechanism, lever actuated brake shoes, a spring for pressing the levers, a motor operated thruster for controlling the spring of the lever actuated brake shoes, a pivotal mounting for the thruster to swing toward and from the brake shoes in operating the spring, and a solenoid comprising a movable core, a lever connected at one end to the core and to the pivotal mounting of the thruster at the other end and the lever pivoted intermediate its ends, the core being moved downwardly to raise the thruster when the core winding and thruster are actuated to release the spring, and the thruster moving downward by gravity to overcome the weight of the core when the thruster and solenoid windings are deenergized.

3. A combined thruster and solenoid brake, comprising a spring pressed brake mechanism, a motor operated movably mounted fluid pressure actuated thruster for controlling the spring pressure application of the brake, a solenoid having a core movable in raising and lowering the thruster, and a lever pivoted intermediate its ends and connected at its opposite ends to the solenoid core and to the thruster for operating them reversely, the solenoid core moving downwardly to raise the thruster when the solenoid is energized and the weight of the thruster exceeding that of the solenoid to raise the solenoid core when the thruster motor and the solenoid are deenergized.

4. In a brake mechanism, the combination of spring pressed brake applicators, of a motor operated bodily movable fluid actuated pressure thruster for controlling the spring pressure application of the brake by relatively up and down movement of the thruster, and a lever connected electro-magnetic means for bodily moving the thruster to produce a quick application of the brake when the motor and electro-magnetic means are deenergized, said lever being pivoted between its ends and connected at the ends to a movable core of the electro-magnetic means and to the thruster to raise one when the other is lowered, and the weight of the thruster exceeding the weight of the said core.

5. A brake mechanism, comprising a motor driven brake drum, spring pressed brake shoes for engaging the drum, a motor operated fluid pressure actuated thruster for controlling the spring pressure application of the brake by relative up and down movement of the thruster, a solenoid actuated movable core for bodily raising and lowering movement with the thruster, a lever pivotally mounted between its ends and connected at the opposite ends to the solenoid core and to the thruster for reversely operating them to raise one when the other is lowered, and circuit controlling means for deenergizing the driving motor, the thruster motor and the solenoid to effect a quick drop of the thruster causing the brake shoes to be set, a corresponding movement of the mounting lever and a raising movement of the solenoid core, the weight of the thruster overcoming the weight of the core and causing the lever to raise the core in the solenoid.

6. In brake mechanism, the combination with spring pressed brake levers, of a motor actuated fluid displacement thruster to release the brake spring, comprising a vertically movable cylinder having a pivotal mounting at its lower end, a solenoid having a movable core and a lever having a fixed pivot between its ends and pivoted at one end to the solenoid core and connected at the other end to the pivotal mounting of the thruster cylinder, and the solenoid being energized and deenergized for quickly raising and allowing the thruster to fall when the solenoid is respectively energized and deenergized.

7. In a brake mechanism, the combination with spring pressed brake levers, of a motor operated fluid displacement thruster comprising a raisable member for relieving the brake lever spring pressure when the motor is operated, a mounting for raising, lowering and pivoting the thruster to swing toward and from the brake levers, a lever connected at one end to the mounting and pivoted between its ends to swing at right angles to the swinging movement of the thruster, and a solenoid having a core pivoted to the other end of the lever and movable oppositely to the raising and lowering movement of the thruster upon its mounting, the core being movable downwardly when the solenoid is energized and being movable upwardly by the weight of the thruster when the solenoid is deenergized.

GEORGE M. ROTHENBERGER.

REFERENCES CITED

The following references are of record in the file of this patent:

UNITED STATES PATENTS

| Number | Name | Date |
| --- | --- | --- |
| 874,219 | Mahoney | Dec. 17, 1907 |
| 891,947 | McCollum | June 30, 1908 |
| 1,989,235 | Kimball | Jan. 29, 1935 |
| 1,991,903 | Logan, Jr. | Feb. 19, 1935 |
| 1,993,613 | Lum | Mar. 5, 1935 |

FOREIGN PATENTS

| Number | Country | Date |
| --- | --- | --- |
| 52,054 | Denmark | Aug. 24, 1936 |
| 521,825 | Great Britain | 1940 |
| 678,641 | Germany | July 21, 1939 |